United States Patent Office 2,848,337
Patented Aug. 19, 1958

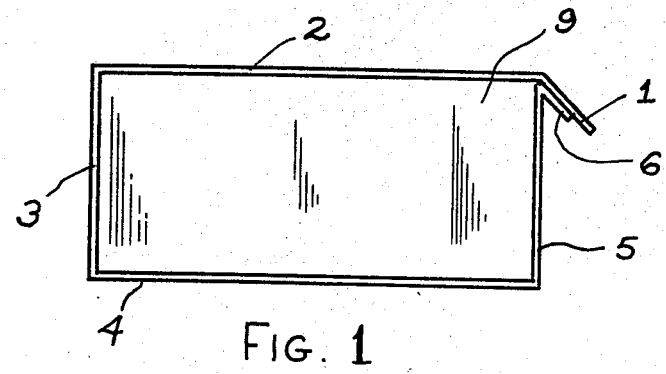
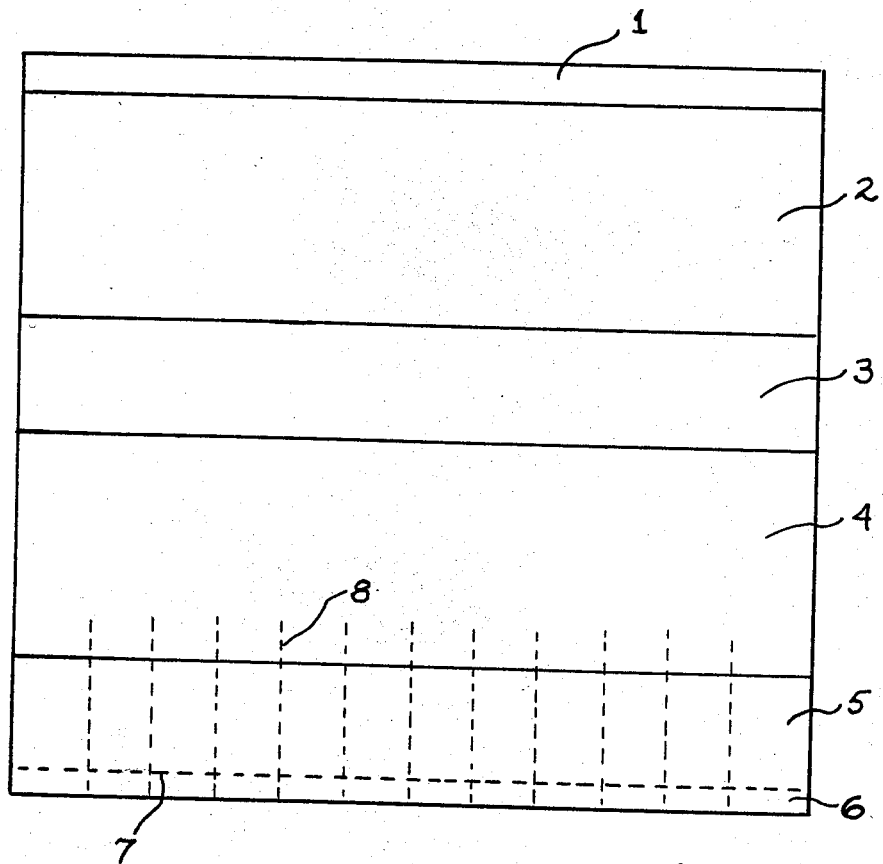

2,848,337
METHOD OF PACKAGING ICE CREAM

Percy White, Worcester Park, and Henry Leslie Bowmer, Forest Gate, London, England, assignors to J. Lyons & Company Limited, London, England Application February 8, 1955, Serial No. 486,992

Claims priority, application Great Britain February 10, 1954

1 Claim. (Cl. 99—180)

This invention relates to the manufacture of ice cream.

In a co-pending application Serial Number 482,575 there is described a method of preparing and cold storing ice cream which can be easily made into wafer sandwiches. In this method, a block of ice cream is enclosed on at least four sides in a wrapping of card or the like; the block including the wrapping is then cut into slices by a saw or the like. It has been found that a block so cut can be packed for storage without the adjacent faces of the ice cream slices becoming frozen together, so that a user or retailer of the ice cream can take a slice, with its wrapper, apply wafer biscuits to the exposed surfaces, and then strip the wrapper from the ice cream. In this way the wafer sandwich can be made by the user or retailer without the need for individually wrapping or separating the slices and without the need of individually cutting a slice of ice cream immediately before making the wafer sandwich.

The present invention is concerned with the production of ice cream in blocks with their card wrapping and suitable for cutting into slices.

The production of blocks of ice cream suitable for this purpose is a problem of considerable difficulty, because of all the considerations involved. For example, the block must be enclosed on four sides, but open at its ends; the wrapping must be fastened to itself so that the blocks can be handled, in particular before hardening, while the ice cream is still relatively soft. It is also very desirable that the ice cream can be fed to form the blocks by a continuous process.

In accordance with the invention, we provide a method of preparing a body of ice cream with a peripheral wrapping, sutiable for cutting into slices in the manner described in the prior application referred to, comprising the steps of forming a blank of card or other suitable material into an open ended channel, depositing in the channel ice cream, bending the blank round the ice cream to form an open ended wrapping extending about the periphery of the ice cream, bringing the marginal portions of the wrapping together so that they extend from the wrapping and fastening the marginal portions together.

By this process there results a wrapped body of ice cream, open at the ends, with the two edges of the blank fastened together to form a projection extending from the wrapping. When the wrapped ice cream has been cut in slices, the card enclosing the narrow edges of each slice will likewise have a projecting part which can be gripped in the fingers to brake the wrapping away. One marginal portion can be weakened to facilitate this breaking.

Other features and advantages of the invention will be apparent from the following description when considered in conjunction with the accompanying drawings in which:

Fig. 1 is an elevational side view of the packaged ice cream brick; and

Fig. 2 is a plan view of the creased cardboard wrapper.

Referring now to the drawings, a block of ice cream 9 is contained in the cardboard blank having marginal sections 1 and 6 and wall sections 2, 3, 4 and 5. As will be explained in greater detail below, the marginal sections are joined by suitable means to form a projection extending from the carton.

As shown in Fig. 2, the carton blank has a plurality of fold lines defining the marginal and wall sections. The lines 8 indicate where the slicing might occur to divide the ice cream block into sandwich size portions.

In this process a card blank of rectangular shape is used; in this particular example the blank was about 20 inches by 11¾ inches and was about .020 inch thick. The card was cut from across the width of a continuous strip of the material so that the grain of the card runs across the width of the card.

The blank is used to form a rectangular block of ice cream 20 inches long, 3½ inches wide and 1⅝ inches deep. The blank is accordingly creased across its width to form four panels 2, 3, 4 and 5 which are alternately 3½ and 1⅝ inches wide; these panels do not occupy the whole width of the blank and the remainder is used to form two marginal strips 1 and 6, one approximately ⅞ inch wide and the other ⅝ inch wide. The narrower marginal strip lies adjacent one of the narrower panels.

A blank is formed into a channel section by being pressed into one of a continuous series of channel shaped supports upon an endless conveyor, the bottom of this support being equal in width to one of the broader panels, that is, 3½ inches wide. In this position one of the narrow panels and the narrower marginal strip stand approximately upright on one side, and the other narrower panel, the other broader panel and the broader panel and the broader marginal strip on the other.

While in this position the blank is fed beneath the extrusion nozzle of a continuous ice cream extruder. In the operation of my invention the nozzle is shaped to discharge the ice cream approximately horizontally and it is arranged to fill the channel to the desired depth of the block, i. e. about 1⅝ inches. At this point it may be observed that the use of horizontal continuous extrusion is desirable since, apart from more rapid production, the ice cream is of better quality than that which can be obtained from a vertical intermittent extrusion such as is presently used for filling cartons. The reason for this is that for intermittent operation the ice cream must be rather more fluid, and hence at a slightly higher temperature on extrusion, and in turn this means that it is more difficult to retain the sufficient proportion of air which is necessary for good quality ice cream.

It is arranged that the blanks on the supports of the conveyor follow closely upon each other with only a small gap of the order of ⅛ inch between their ends, and thereby the continuous extrusion can be carried out.

The now filled blanks are passed to a forming section, where the projecting portions of the blank are folded over until a complete wrapping is formed round the tube, and the marginal strips 1 and 6 are brought togther, with their inside faces in contact. To close the wrapping these edges are secured together, and this can be done in a variety of ways. Thus the edges can be sewn with a nylon or like thread, stapled or interlocked with tongue and slot or like connections but preferably a pressure sensitive adhesive such as rubber latex is used. If adhesive is used, it may be convenient to apply the adhesive to the blank while it is in the flat condition.

When the blocks have been wrapped and sealed as described above, they advance on the conveyor to a discharge point, where a knife or wire is passed between the adjacent ends of the blocks to separate them, they can then be passed to a hardening tunnel, where they are allowed to remain until they are hard frozen. They are then cut into slices by a reciprocating saw frame in the manner described in our earlier application.

Each slice can be made into a wafer sandwich as described above by applying the wafer biscuits to the exposed major surfaces and stripping the wrapper. The marginal edges which are fastened together project or can be bent to project from the slice to facilitate this stripping, and in order to make it easy to break the wrapping the junction of one of the marginal strips 6 with the adjacent panel 5 can be weakened by slitting, perforating or the like. Since it is necessary to hold together the marginal strips only until the block is hard frozen, after which the wrapping is held in position by the frozen ice cream or ice, the slots or perforations can be extensive and can extend across several slices.

We prefer that the narrower marginal portion should remain anchored to its adjacent panel at spaced points when the severing operation to weaken the joint between that portion and that panel is complete, and that the points of anchorage should be less than the width of the ultimate portions of ice cream. Thus when the block is wrapped and the marginal portions are secured together by adhesive the anchorage is sufficient to keep the block wrapped and after cutting the blocks into slices the wrapping is easily removable. In some cases the wrapping will have been severed already at the junction of the narrower marginal portion and the adjacent panel and the wrapping will remain in position until removal by adherence to the ice cream whilst in other cases, where a point of anchorage comes within the margins of an ice cream portion, the double layer tongue formed by the two marginal portions will be more strongly secured to the wrapping through the wider marginal portion and upon pulling the tongue the wrapping will break substantially cleanly along the junction of the narrow marginal panel and its adjacent panel.

The embodiment of the invention described thus provides a method of continuously extruding blocks of ice cream, for use in the process described in our earlier application.

We claim:

A method of preparing a body of ice cream with a peripheral wrapping comprising the steps of folding each of a plurality of unitary cardboard blanks into open-ended channels along a plurality of parallel fold lines to define a plurality of panels the two outermost of which are of unequal width, weakening on each of said blanks the fold line defining the narrower outermost panel, arranging said channel-formed blanks in end to end relationship passing said channel-formed blanks beneath a horizontal nozzle through which is continuously produced an extrusion of ice cream in a relatively soft state to deposit said extrusion into said channels, bringing said outermost two panels of each of said blanks to form said blanks about the periphery of said extrusion, securing said outermost two panels together to form a laterally projecting tongue of double thickness, severing the extrusion between successive blanks, and hardening the extrusion by lowering the temperature thereof.

References Cited in the file of this patent

UNITED STATES PATENTS

| 1,810,864 | Vogt | June 16, 1931 |
| 1,906,183 | Vogt | Apr. 25, 1933 |
| 2,062,278 | Vogt | Nov. 24, 1936 |
| 2,062,279 | Vogt | Nov. 24, 1936 |

FOREIGN PATENTS

| 115,189 | Australia | Sept. 6, 1941 |